United States Patent [19]

Tveit et al.

[11] Patent Number: 5,108,534

[45] Date of Patent: Apr. 28, 1992

[54] APPARATUS AND METHOD FOR PEELING A SHEET OR LAYER FROM A WORKPIECE

[75] Inventors: Gary L. Tveit, Churchville; Terence J. Fitzgerald, Rochester, both of N.Y.

[73] Assignee: Eastman Kodak Company, Rochester, N.Y.

[21] Appl. No.: 592,049

[22] Filed: Oct. 3, 1990

[51] Int. Cl.⁵ .............................................. B32B 31/16
[52] U.S. Cl. .................................. 156/344; 156/584
[58] Field of Search ............... 156/584, 247, 249, 268, 156/344; 430/256; 40/638

[56] References Cited

U.S. PATENT DOCUMENTS

| | | | |
|---|---|---|---|
| 3,451,872 | 6/1969 | Townsend | 156/344 X |
| 4,183,751 | 1/1980 | Matsumoto et al. | 156/344 X |
| 4,508,589 | 4/1985 | Tarui et al. | 156/584 |
| 4,631,110 | 12/1986 | Tsumura et al. | 156/344 X |
| 4,867,836 | 9/1989 | Hamamura et al. | 156/344 X |
| 4,880,488 | 11/1989 | Matsuo et al. | 156/344 |

Primary Examiner—Michael W. Ball
Assistant Examiner—Mark A. Osele
Attorney, Agent, or Firm—L. George Legg

[57] ABSTRACT

An apparatus and method are disclosed for removing a sheet or layer such as a release sheet (56) from a workpiece. A pair of pinch rollers (18,24) grasps a lifted portion (60) of the release sheet and drives the release sheet therebetween to plate means (34,36) that guide the release sheet away from the pinch rollers.

9 Claims, 4 Drawing Sheets

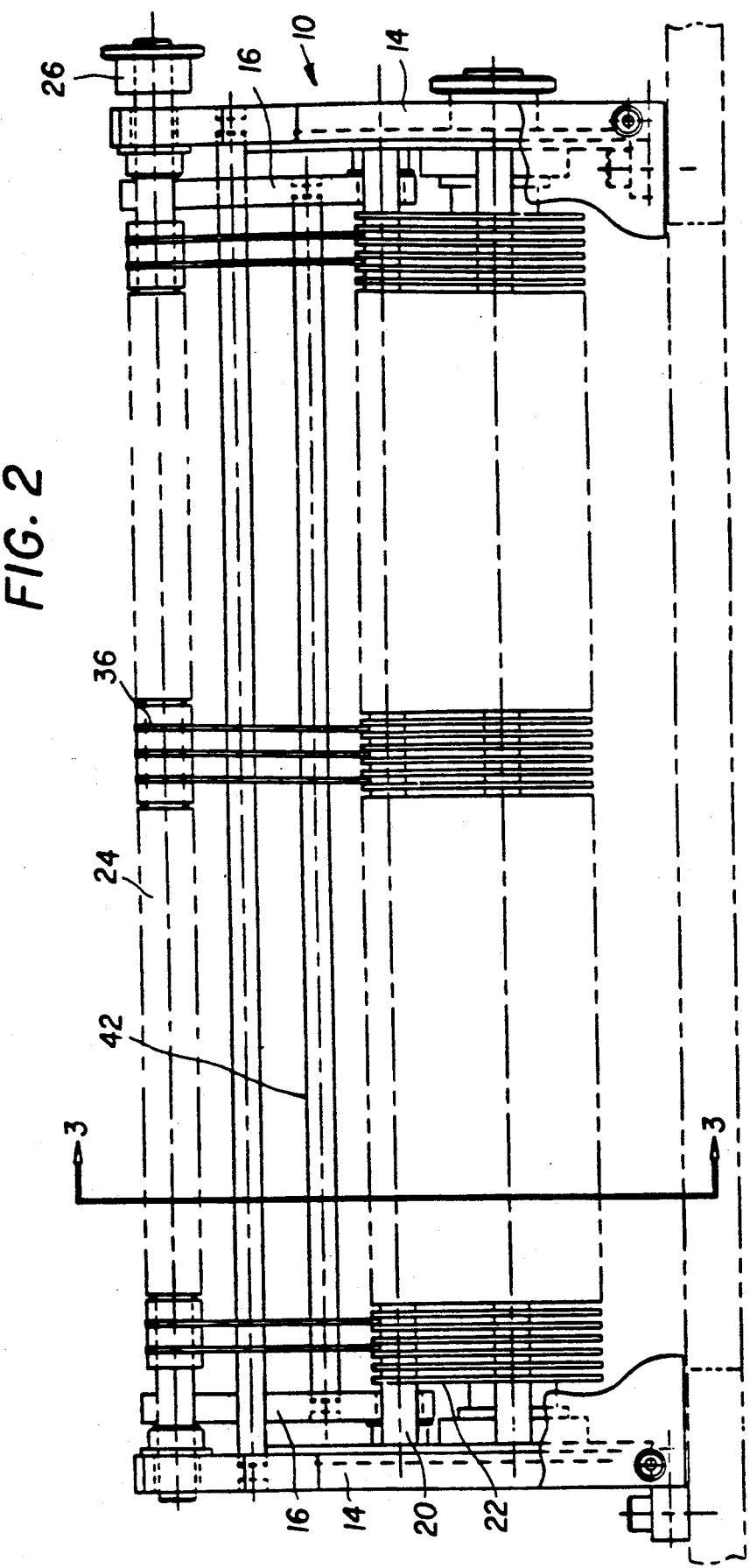

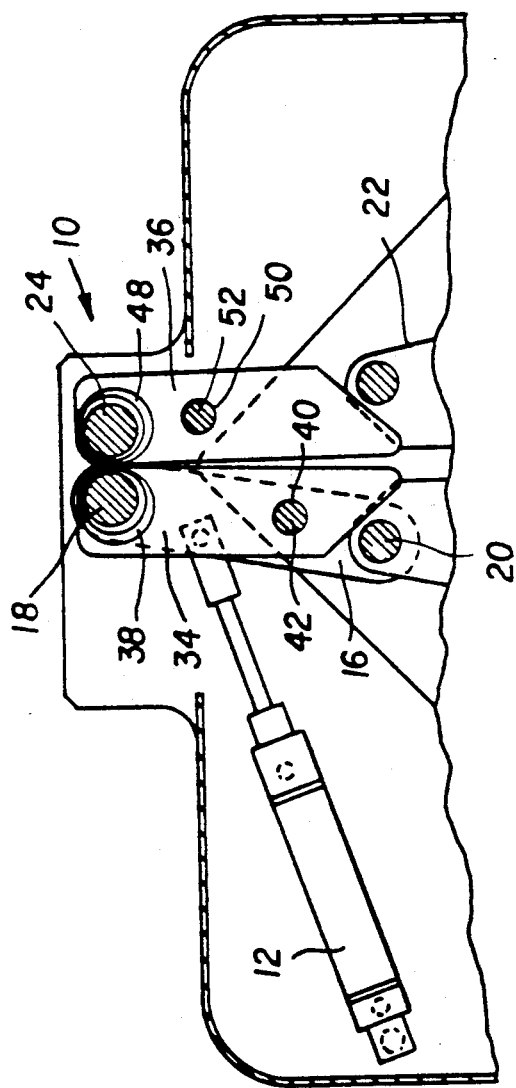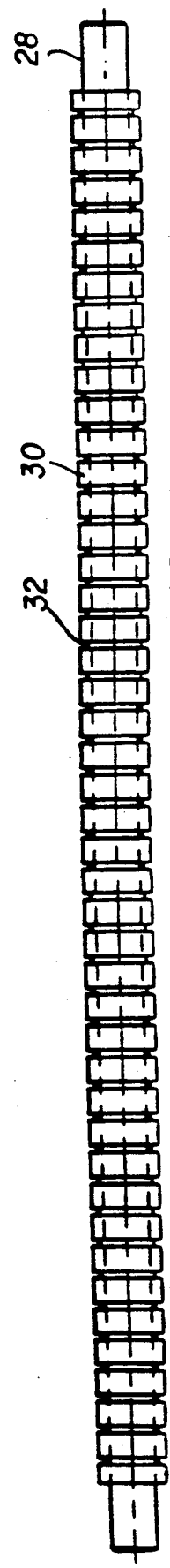

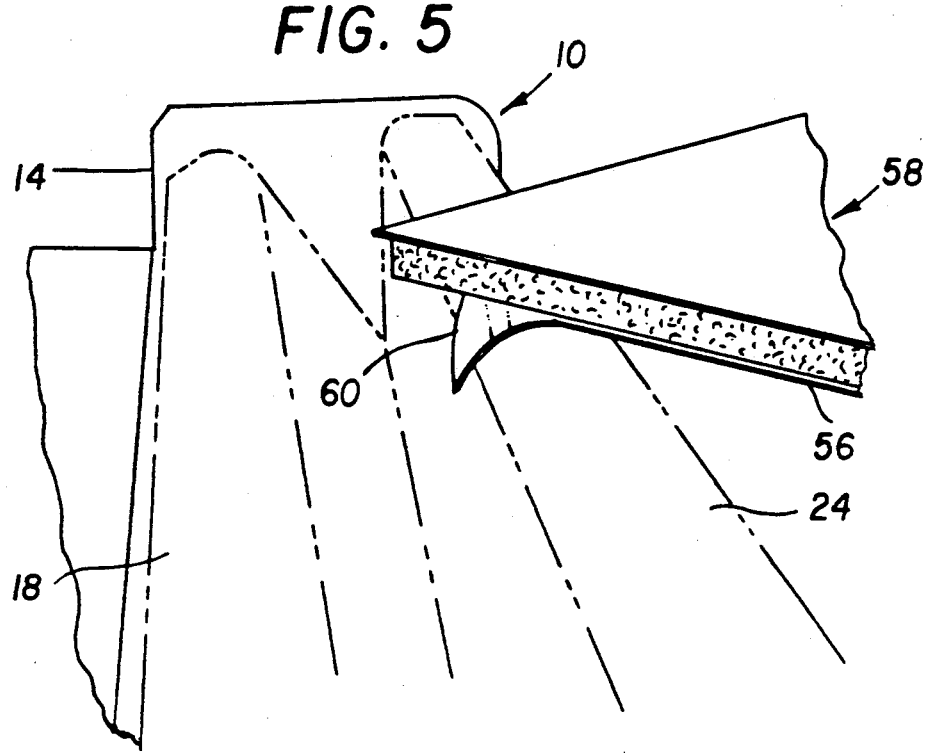
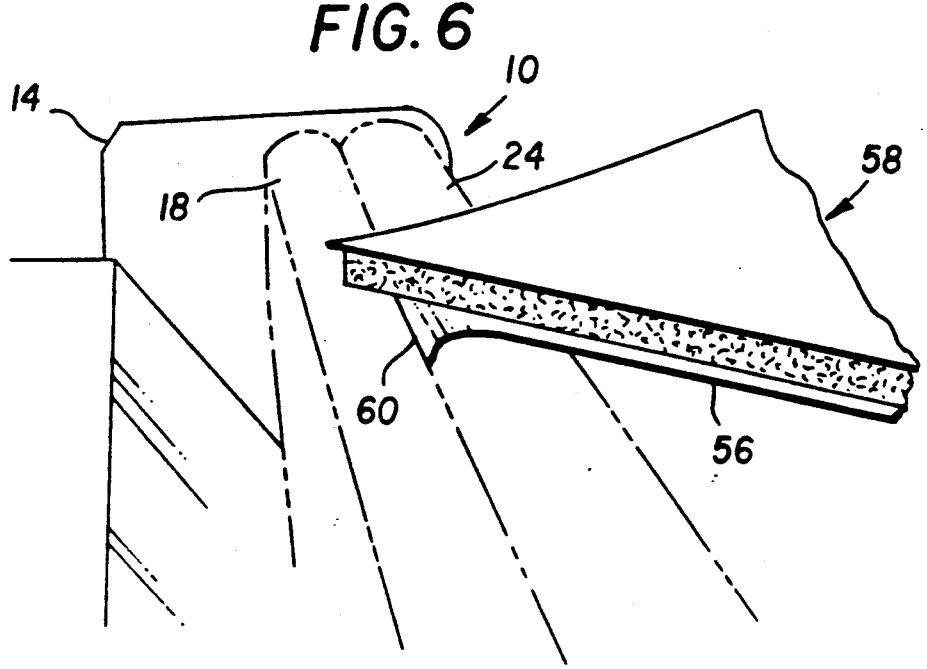

APPARATUS AND METHOD FOR PEELING A SHEET OR LAYER FROM A WORKPIECE

CROSS REFERENCE TO RELATED APPLICATION

This application is related to co-pending U.S. patent application Ser. No. 592,939, filed Oct. 3, 1990, entitled "Apparatus and Method for Removing a Release Sheet from a Workpiece".

DESCRIPTION

1. Technical Field

The present invention concerns an apparatus and a method for peeling a sheet or layer adhered to a surface of a workpiece. More particularly, the invention concerns an apparatus and method wherein a lifted portion of the sheet or layer is grasped and at least partially peeled from the workpiece.

2. Background Art

Frequently it is necessary to strip a covering sheet of material from a workpiece, for example a sheet or layer from an adhesive on a substrate, prior to further use of the workpiece. A manufacturer, for example, may have to order and inventory a part, in quantity, having an adhesive on a surface for subsequently attaching the part to another part during manufacturing, and the adhesive may have a sheet or layer affixed thereto to cover and thus secure the adhesive for the later intended use. It is then necessary to remove the sheet or layer prior to the intended manufacturing use.

The most common prior art approach to removing a sheet or layer from a workpiece is to do so manually. This, however, requires a great amount of time, is costly and inefficient, and is a fatigue-inducing task. Other approaches that are either automated or are a combination with manual have been tried as well.

One prior art approach used to remove a sheet or layer from an adhesive tape or backing employs an adhesive roller to lift a portion of the sheet or layer from the backing. The sheet or layer can then be removed by positioning the lifted portion between a pair of closed discharge rollers. U.S. Pat. No. 4,508,589 describes apparatus for stripping a protective coating from a substrate in which the protective coating is lifted from the substrate by an adhesive roller, and is then separated from the adhesive roller by a projecting rod, which pushes a portion of the coating between discharge rollers biased by a spring. The biasing spring produces a design, set contact force between the rollers. The discharge rollers compact the coating and rotate to discharge the coating. A disadvantage of this approach is that the design contact force between the rollers must be sufficient to ensure that the coating is discharged between the rollers, and the rollers can experience high wear due to the contact force. This is especially so when it is desired to remove a sheet or layer that is thin and/or has a smooth surface, since a high contact force may be necessary for the rollers to drive the sheet therebetween without substantial slippage. Another disadvantage is that the spring constant of the biasing spring can be nonlinear over the practiced compression range or can become nonlinear or decrease over the operation life of the spring, causing a variation in operating parameters that can necessitate more frequent maintenance or replacement of the apparatus.

Another prior art approach is described in U.S. Pat. No. 4,880,488, which describes a film removal device comprising a plurality of movable belt conveyors and stationary belt conveyors. Each movable belt conveyor is positionable to approach or contact the belt of one of the stationary belt conveyors and drive the film therebetween. A disadvantage is that the belts may exhibit high wear from their mutual contact and from contact with belt roller surfaces. Another disadvantage is that the belts may stretch and loosen or may flex during operation, causing undesireable changes in position of the belts and necessitating larger diameter rollers. Larger diameter rollers necessitate a longer length of lifted film to access the contact area between the rollers and between the belts. A further disadvantage is that a thin or flimsy film can catch in the spaces between adjoining belts, leading to nonremoval of the film and interference with subsequent film removal.

Another prior art approach uses a shredder to accept a sheet or layer for shredding. A disadvantage to using a shredder for grasping and removing a sheet or layer from a workpiece is that nonuniform grasping and removing forces can occur during shredding and the sheet or layer may only partially be removed from the workpiece. A further disadvantage is that a shredder having a recessed access area necessitates a long lifted portion on the sheet or layer for the shredder to grasp the sheet or layer.

The present invention is effective in removing a sheet or layer having a smooth surface without a resultant high degree of wear to the discharge surfaces. It can be successfully used with a relatively small lifted portion of a sheet or layer. It can be successfully used with relatively flimsy or thin sheets or layers. It also provides a substantially uniform grasping force and removing force to successfully remove an entire sheet or layer from a workpiece.

SUMMARY OF THE INVENTION

The primary objective of this invention is to provide an apparatus for at least partially removing a sheet or layer from a workpiece. A further objective of this invention is to provide such an apparatus that removes a sheet or layer from a workpiece and shreds the sheet or layer.

These objectives are given only by way of illustrative examples; thus, other desireable objectives and advantages inherently achieved by the disclosed invention may occur or become apparent to those skilled in the art. Nonetheless, the scope of the invention is to be limited only by the appended claims.

In one embodiment of the invention, there is provided an apparatus for at least partially removing from a workpiece a sheet or layer adhered to a surface of the workpiece. Drive means is provided comprising a pair of pinch rollers each having a drive surface thereon, for grasping a lifted portion of the sheet or layer and driving the sheet or layer therebetween. Also provided are a plurality of plate means rotatably mounted on each pinch roller for guiding the sheet or layer away from the drive means. In a preferred embodiment the peeler further comprises means for permitting each plurality of plate means to retract so that the drive means can be positioned with the pinch rollers in axial contact. In another preferred embodiment of the invention, the peeler further has means for adjusting the pinch roller surface contact force. Another preferred embodiment of the invention further comprises a shredder to receive and shred a removed sheet or layer from the peeler.

In a preferred embodiment, the means for grasping and removing is a peeler assembly. The peeler assembly has drive means comprising a pair of pinch rollers for grasping a lifted portion of the sheet or layer and driving the sheet or layer therebetween. The peeler also comprises a plurality of plate means loosely suspended from each said drive means for guiding the sheet or layer away from the drive means. A preferred means for moving further comprises adjusting means to adjust the contact force between the pinch rollers.

In another preferred embodiment, the peeler assembly comprises a housing; a first, movable shaft having a first resilient surface; and a second, drive shaft having a second resilient surface. Means is provided for pivoting the first shaft into axial contact with the second shaft. A preferred means for pivoting is an adjustable pneumatic cylinder, pivotally attached to the first shaft to pivot the first shaft into and out of axial contact with the second shaft, with an adjustable contact force therebetween. Each resilient surface has a plurality of circumferentially extending grooves. Each of a first plurality of feed plates is loosely and rotatably mounted by a first bore in one of the grooves of the first shaft, and each of a second plurality of feed plates is loosely and rotatably mounted by a first bore in one of the grooves of the second shaft, so that when the first and second shafts are in contact, each feed plate on the first shaft and each feed plate on the second shaft retracts into its respective groove to allow the first resilient surface to contact the second resilient surface. The peeler also has means for rotating the second shaft. The lower peeler assembly preferably includes a conventional shredder. The release sheet is grasped between the resilient surfaces and driven through the pinch rollers to the feed plates. The feed plates guide the release sheet away from the pinch rollers and to the shredder to at least partially remove the release sheet from the foam pad.

In another embodiment of the invention, there is provided a method of removing a sheet or layer from a workpiece, comprising the steps of providing a pair of pinch rollers, each pinch roller having a drive surface thereon, for grasping a lifted portion of the sheet or layer and driving the sheet or layer therebetween; providing a plurality of plate means for guiding the sheet or layer away from the drive means; rotatably mounting the plurality of plate means on the pinch rollers; positioning the lifted portion between the pinch rollers; axially contacting the pinch rollers to grasp the lifted portion; and rotating the pinch rollers toward one another to remove the sheet or layer from the workpiece and drive the sheet or layer between the plate means.

BRIEF DESCRIPTION OF THE DRAWINGS

In the accompanying drawings:

FIG. 2 is a front elevation, fragmentary view of a peeler assembly according to the invention taken along line 2—2 of FIG. 1.

FIG. 3 is a sectional, fragmentary view taken along line 3—3 of FIG. 2, illustrating details of the peeler assembly with the pinch rollers closed.

FIG. 4 is a plan view of a pinch roller according to the invention.

FIG. 5 is a perspective view of a lifted corner of a release sheet on a foam pad positioned between the pinch rollers of a peeler assembly according to the invention with the pinch rollers in an open position.

FIG. 6 is a perspective view of a lifted corner of a release sheet on a foam pad positioned between the pinch rollers of a peeler assembly according to the invention with the pinch rollers in a closed position.

DESCRIPTION OF THE PREFERRED EMBODIMENTS

Figure 1:
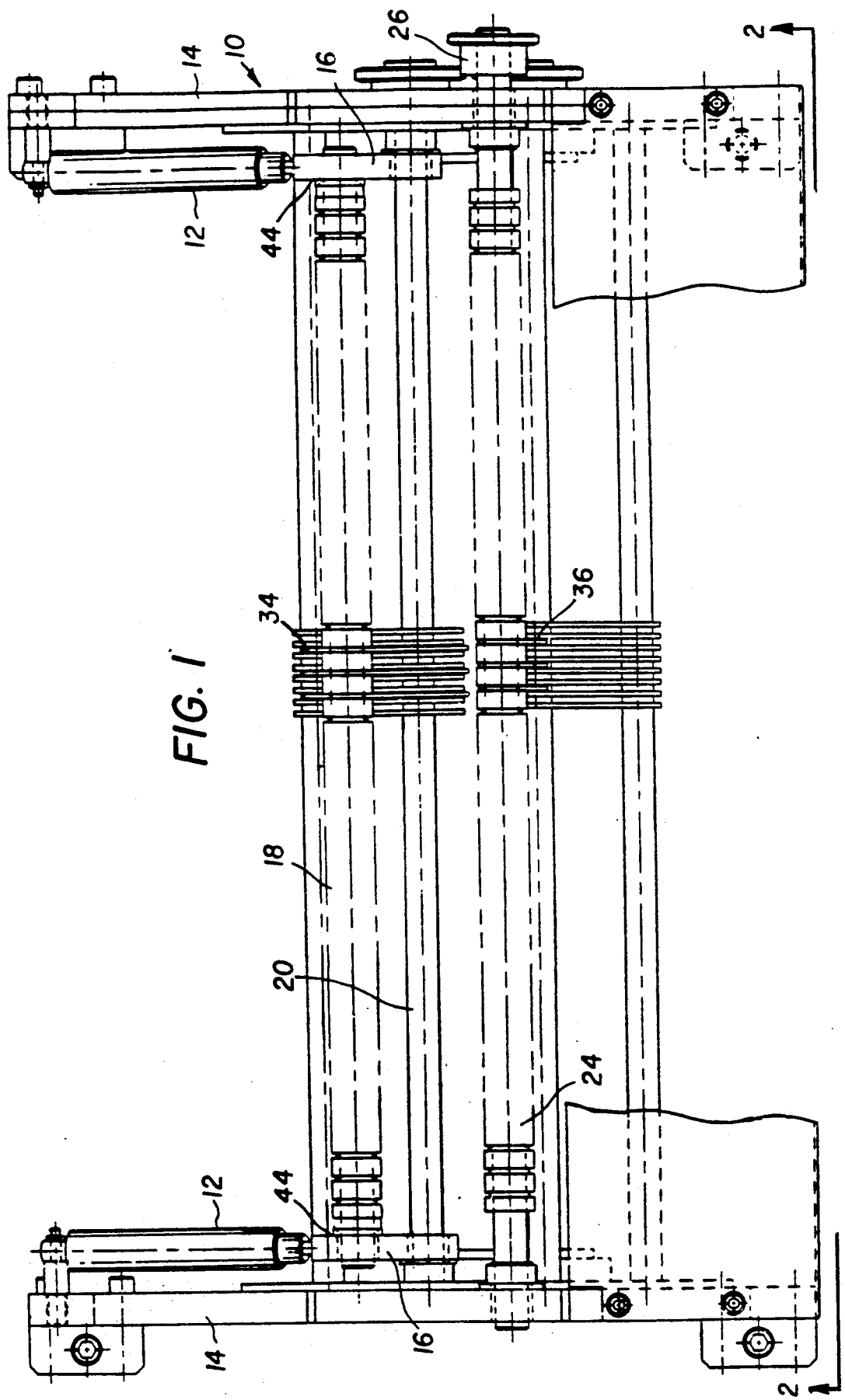
FIG. 1 is a top plan, fragmentary view of a peeler assembly according to the invention.

The following is a detailed description of the preferred embodiments of the invention, reference being made to the drawings in which the same reference numerals identify the same elements of structure in each of the several Figures.

Referring simultaneously to FIGS. 1 to 3, peeler 10 according to the invention is seen to comprise a pair of adjustable pneumatic cylinders 12 mounted on opposite interior surfaces of a housing comprising end walls 14. The drive means of peeler 10 comprises a pair of pinch rollers, described below. Adjustable pneumatic cylinders 12 are means for pivoting the rollers into and out of axial contact, and are also means for adjusting the pinch roller contact force. Each cylinder 12 is pivotally attached to the adjacent end wall 14 at its respective head end. The actuator rod of each cylinder 12 is pivotally attached between the ends of a pivot arm 16. Each cylinder 12 is adjustable to select the pneumatic force on each actuator rod and thereby adjust the contact force between the pinch rollers. Each pivot arm 16 is rotatably mounted by a bearing to each respective end of a first pinch roller comprising movable nip roller shaft 18, and is rotatably mounted by a bearing to each respective end of a fixed pivot shaft 20 which in the embodiment described herein also supports a shredder head 22 of a conventional shredder assembly (not illustrated) between end walls 14. The combination peeler 10 and shredder is a preferred embodiment of the invention, although alternatively peeler 10 can be used without a shredder.

The second pinch roller is a fixed nip roller drive shaft 24 that is rotatably mounted by a journal at each end to bearings in end walls 14 such that the axis of drive shaft 24 is substantially parallel to the axis of movable shaft 18 and lies in approximately a horizontal plane therewith when cylinders 12 are extended to contact movable shaft 18 with drive shaft 24. Drive shaft 24 has at one end thereof drive sprocket 26 that is associated with a drive means (not illustrated). Drive means, for example, can comprise a direct drive gear motor having a gear engaged with drive sprocket 26, or a motor having a drive chain engaged with drive sprocket 26. Movable shaft 18 and drive shaft 24 preferably remain in a closed position, that is, movable shaft 18 has not been retracted by cylinders 12, when peeler 10 is in a stand-by mode. However, the stand-by position of these shafts are within the operator's discretion in practicing the apparatus and method of the invention.

As further illustrated in FIG. 4, both movable shaft 18 and drive shaft 24 comprise a metal shaft 28, having nonrotatably affixed thereon a polyurethane coating 30 of uniform thickness having a plurality of axial, circumferentially extending grooves 32 spaced equally apart. Each of grooves 32 guides and axially secures one of a plurality of feed plates 34 on shaft 18 and one of a plurality of feed plates 36 on shaft 24. Feed plates 34 and 36 are plate means for guiding removed release sheet 56 away from shafts 18 and 24. The plate means are rotatably mounted on each respective pinch roller. The plate means are shaped and are positionable to allow the pinch rollers to contact axially. In the preferred embodiment described herein, each feed plate 34 has a first bore 38 therethrough by which it is loosely and rotatably mounted in groove 32 of polyurethane coating 30 on movable shaft 18. Each feed plate 34 has a second bore 40 therethrough for rotatably receiving a guide shaft 42. Guide shaft 42 is rigidly mounted between the ends of pivot arms 16. Each feed plate 36 has a first bore 48 therethrough by which it is loosely and rotatably mounted in groove 32 of polyurethane coating 30 on drive shaft 24. Each feed plate 36 has a second bore 50 therethrough for rotatably receiving a mounting shaft 52 which extends between end walls 14. The loose mounting of each feed plate in each respective groove described above permits retraction of each feed plate into its respective groove when the feed plate upon contact by the opposing shaft or by a feed plate on the opposing shaft, permitting the pinch rollers to axially contact.

Feed plates 34 and 36 each are sized to fit snuggly into one of a plurality of grooves 54 in shredder head 22. Means for permitting feed plates 34 and 36 to retract into grooves 32 comprise bore 38 in feed plate 34 and bore 48 in feed plate 36 which are sized larger than grooves 32 on shafts 18 and 24, respectively. Feed plates 34 and 36 are spaced uniformly on shafts 18 and 24 and positioned so that each of feed plates 34 is opposite one of feed plates 36. Consequently, when peeler 10 is running so that movable shaft 18 and drive shaft 24 are closed, feed plates 34 on movable shaft 18 contact feed plates 36 on the opposing shaft 24, thus causing the upper ends of both pluralities of feed plates to retract into each of their respective grooves 32. The retraction causes movable shaft 18's polyurethane coating 30 to axially contact drive shaft 24's polyurethane coating 30. Independent rotation of drive shaft 24 then causes movable shaft 18 to dependently rotate in the opposite direction, that is, toward one another, with feed plates 34 and 36 nonrotational. Similarly, with a release sheet 56 positioned between the pinch rollers, drive shaft 24 causes movable shaft 18 to rotate, driving release sheet 56 therebetween. In an alternate embodiment, means for causing feed plates 34 and 36 to retract could constitute independent means not dependent on contact with an opposing shaft or feed plate. For example, a retractable rod connecting a plurality of feed plates is means for retracting the plurality of feed plates.

Peeler 10 operates as follows starting from its standby configuration with pinch roller shafts 18 and 24 closed. The actuator pistons of cylinders 12 are retracted, causing each pivot arm 16 to rotate about fixed pivot shaft 20 with guide shaft 42 following and causing feed plate 34 to rotate, shifting movable shaft 18 away from drive shaft 24 to the open position illustrated in FIG. 5. Foam pad 58 is positioned so that lifted portion 60 of release sheet 56 is positioned between movable shaft 18 and drive shaft 24, with lifted portion 60 approximately parallel to the axes of rotation of drive shaft 24 and movable shaft 18. Cylinders 12 are then actuated to extend their actuator pistons, causing movable shaft 18 to pivot and axially contact drive shaft 24. As a result, lifted portion 60 is grasped between the two shafts, as illustrated in FIG. 6. The drive means is then actuated to rotate drive sprocket 26 and drive shaft 24. The direction of rotation of drive shaft 24 is selected so that release sheet 56 is peeled away from foam pad 58. The independent rotation of drive shaft 24 and dependent opposite rotation of movable shaft 18 causes grasped release sheet 56 to be pulled and driven between movable shaft 18 and drive shaft 24 and away from foam pad 58. As release sheet 56 is driven between shafts 18 and 24, foam pad 58 is moved horizontally and transversely above the two shafts at a speed sufficient to result in removing release sheet 56 with substantially no tearing of release sheet 56 and substantially no bending of foam pad 58. One skilled in the art can determine the speed at which foam pad 58 should be moved during the above-described release sheet removal for the selected operating parameters, such as the speed of drive shaft 24, the force of adhesion of release sheet 56 to foam pad 58, and so forth. It is preferred that foam pad 58 be moved at a speed at least equal to the speed at which release sheet 56 is drawn through the pinch rollers and in the direction approximately perpendicular to the direction of removal of release sheet 56.

As release sheet 56 is drawn between movable shaft 18 and drive shaft 24, feed plates 34 and 36 guide release sheet 56 into shredder head 22. The apparatus of the invention can also be practiced without the shredder and with release sheet 56 just being removed. Release sheet 56 can be completely or partially removed from foam pad 58, since it may be acceptable or desirable to practice the invention removing just part of the sheet. Such could be the case, for example, should it be desired to first utilize just the partially exposed adhesive on foam pad 58 and either leave the rest of release sheet 56 on foam pad 58 or remove some or all of it subsequently.

The present invention can be advantageously employed in manufacturing processes in which it is necessary to remove a covering sheet from a workpiece. It provides very significant benefits. By removing a covering sheet automatically time and money can be saved and the fatigue-inducing task eliminated compared to manual removal. The invention can be used to remove a sheet or layer that is thin and/or has a smooth surface, or conversely to remove a thick sheet and/or one with a rough surface since the pinch roller contact force can be adjusted. The contact force can be set at a selected level without substantial variation from the level selected. The drive surfaces do not exhibit high wear as can be found with belt roller surfaces. The apparatus can grasp a relatively small lifted portion to remove a sheet or layer. The apparatus can remove a thin or flimsy sheet without the sheet catching in and interfering with the operation of the apparatus. The apparatus provides a uniform removal force to remove a sheet or layer without slipping or stopping.

The invention has been described in detail with particular reference to certain preferred embodiments thereof, but it will be understood that variations and modifications can be effected within the spirit and scope of the invention.

What is claimed is:

1. An apparatus for removing a sheet or layer from a workpiece, comprising:
   drive means comprising a pair of pinch rollers, each pinch roller having a drive surface thereon, for grasping a lifted portion of such sheet or layer and driving such sheet or layer therebetween; and
   a plurality of plate means rotatably mounted on each said pinch roller for guiding such sheet or layer away from said drive means.

2. The apparatus of claim 1, further comprising a shredder.

3. The apparatus of claim 1, further comprising means for retracting said plurality of plate means rotatably mounted on each said pinch roller whereby said drive means can be positioned with said pinch rollers in mutual axial contact.

4. An apparatus for removing a sheet or layer from a workpiece, comprising:
   a housing;
   a movable shaft, having a resilient surface thereon having therein a plurality of axial, circumferentially extending grooves spaced apart;
   a drive shaft, having a resilient surface thereon having therein a plurality of axial, circumferentially extending grooves spaced apart, said drive shaft being opposed to said movable shaft;
   means for pivoting said movable shaft into axial contact with said drive shaft;
   a first plurality of feed plates loosely and rotatably mounted on said movable shaft;
   a second plurality of feed plates loosely and rotatably mounted on said drive shaft; and
   means for rotating said drive shaft.

5. The apparatus of claim 4, further comprising means for retracting each said plurality of feed plates whereby said drive means can be positioned with said pinch rollers in mutual axial contact.

6. The apparatus of claim 4, wherein said means for pivoting comprises an adjustable pneumatic cylinder further having means for adjusting pinch roller contact force.

7. The apparatus of claim 4, further comprising a shredder.

8. The apparatus of claim 4, wherein:
   each of said first plurality of feed plates has a first bore therein by which each feed plate of said first plurality is loosely and rotatably mounted in one of said circumferentially extending grooves of said movable shaft;
   each of said second plurality of feed plates has a first bore therein by which each feed plate of said second plurality is loosely and rotatably mounted in one of said circumferentially extending grooves of said drive shaft;
   whereby when said movable shaft is pivoted toward such axial contact with said drive shaft, each feed plate on each of said movable and drive shafts is contacted by the opposing shaft or one of the plates on the opposing shaft, so that said feed plates retract into their respective circumferentially extending grooves to allow said resilient surface on said movable shaft to axially contact said resilient surface on said drive shaft.

9. A method of removing a sheet or layer from a workpiece, comprising the steps of:
   providing a pair of pinch rollers, each pinch roller having a drive surface thereon, for grasping a lifted portion of such sheet or layer and driving such sheet or layer therebetween;
   providing a plurality of plate means for guiding such sheet or layer away from said drive means;
   rotatably mounting said plurality of plate means on said pinch rollers;
   positioning said lifted portion between said pinch rollers;
   axially contacting said pinch rollers to grasp said lifted portion; and
   rotating said pinch rollers toward one another to remove such sheet or layer from such workpiece and drive such sheet or layer between said plate means.

* * * * *